United States Patent [19]

Smart

[11] Patent Number: 5,145,235
[45] Date of Patent: Sep. 8, 1992

[54] MEASUREMENT OF THE ALIGNMENT OF AN ARTICULATED MINE CONVEYOR

[75] Inventor: Brian G. D. Smart, Falkirk, Great Britain

[73] Assignee: Gullick Dobson Limited, Lancashire, Great Britain

[21] Appl. No.: 654,737

[22] Filed: Feb. 13, 1991

[30] Foreign Application Priority Data

Feb. 13, 1990 [GB] United Kingdom ............... 9003214

[51] Int. Cl.$^5$ ...................... E21C 35/20; B65G 45/00
[52] U.S. Cl. ...................................... 299/1.9; 198/301
[58] Field of Search ................. 299/1.9, 32, 43, 18; 405/299, 302; 198/301

[56] References Cited

U.S. PATENT DOCUMENTS 4,206,840 6/1980 Hanson .................... 198/301
4,453,846 6/1984 Mullins et al. ............... 299/1 X

FOREIGN PATENT DOCUMENTS 1262945 3/1968 Fed. Rep. of Germany .......... 299/1
2232443 7/1972 Fed. Rep. of Germany .......... 299/1
875106 10/1981 U.S.S.R. ................................ 299/43

Primary Examiner—David J. Bagnell
Attorney, Agent, or Firm—Brooks & Kushman

[57] ABSTRACT

Mining apparatus comprises two rigid elongate members joined together in an articulated manner and a signalling device arranged to provide information dependent upon the relationship of one of the members with respect to the other of the members. The invention is particularly applicable to measure the relationship between adjacent pans and an articulated mine conveyor, for example to assist in the alignment of the conveyor. The signalling device may have two base members which, in use are respectively bolted to two adjacent pans of an articulated conveyor. Relative movement between the members is translated by components into movement detectable by rectilinear potentiometers.

12 Claims, 1 Drawing Sheet

MEASUREMENT OF THE ALIGNMENT OF AN ARTICULATED MINE CONVEYOR

TECHNICAL FIELD

This invention relates to the control and alignment of two or more rigid elongate members connected at their ends in an articulated manner and may be adapted for use in mining apparatus and methods, particularly, though not exclusively, with the alignment of a mineral bearing face during mining operations, for example using the longwall method of mining, and with equipment which may influence this alignment.

BACKGROUND ART

As is well known during the longwall method of mining, an elongate flexible conveyor extends along the workings adjacent the mineral bearing face. The flexible conveyor is made up of a plurality of conveyor sections, known as pans, bolted together at their ends so that the conveyor can articulate in both vertical and horizontal planes. A mining machine travels up and down the conveyor cutting away a web of mineral with each pass of the machine, and the cut mineral is conveyed to one end of the face by the upper run of the conveyor. Behind the conveyor, and parallel thereto, there is arranged a row of mine roof supports, each connected to the conveyor by a forwardly extending hydraulic ram. Each support comprises a base, a roof engaging canopy and supporting legs or jacks positioned between the base and the canopy.

Once the mining machine has moved past a group of supports, by at least a given distance known as the "snaking distance" (being the linear distance along the length of the conveyor over which the pans are re-aligned in their advanced location relative to the position the pans were aligned in their previous position, normally over a length of conveyor comprised of nine pans although the greater the advance then the greater the number of pans over which the snaking takes place), the supports push the associated portion of the conveyor forwardly using the advancing rams, and the supports are then sequentially freed from the roof by lowering their legs, and the advancing rams are then used to pull the supports into a new position where they again become adjacent to the conveyor. Thus, as the mining machine moves along the conveyor, the conveyor is gradually moved forward in a snake-like manner, into the newly exposed area created by the passage of the mining machine.

The conveyor is so designed with appropriate spaces between the pans such that during the start of its advance the curvature of the snaking conveyor means that the pan sections abut at their leading edge and are spaced apart at their trailing edge insofar as the bolts connecting the pans will allow, and during a normal advance the angle between the pans will be 6 to 9 degrees maximum, dependent upon the number of pans over which the snake takes place, e.g. 13 or 9. At the halfway position, there is an equi-distant gap between the pans while upon approaching the new aligned position the pans are spaced apart at their leading edge and abut at their trailing edge. During the "snake" sequence, the joints between the pans tend to be stretched such that the pan is in a similar position along the face before and after the conveyor has advanced. If adequate gaps were not present, the conveyor would tend to drift toward one end of the face, taking the roof supports with it. This drift is known as conveyor creep and was extremely common before the introduction of mine roof supports which hold the conveyor against such unwanted movement.

It should be borne in mind that during this snaking sequence the conveyor remains in use, conveying mineral to one end of the face and as such the drive chain and transverse flights scraping elements have to negotiate the snake in the conveyor. The conveyor is further designed to operate on a surface which undulates along the length of the face and the clearance provided between the pans allows this to take place.

For various reasons, all the supports may not move forwardly by exactly the same amount, and equally each portion of the conveyor may not move forwardly by exactly the same amount. Consequently, the conveyor may gradually take up a configuration along its full length which is not absolutely straight, and so the mineral bearing face may eventually become misaligned.

The flexible conveyors referred to typically have endless drive chains which draw the flights along the conveyor, the chains running either centrally or at each end of the flight. The flights and/or chains are restrained by the side walls of the conveyor on both the drive (above the scraping surface) and return runs (below the scraping surface) of the conveyor. Any misalignment of the conveyor pans not only causes excessive wear on the sides of the conveyor but also increases the loadings on the drive motors. Such is the nature of this type of conveyor that an unacceptable degree of misalignment can cause the flights and chain to disengage from the pans which causes a major delay in production and often the need to dismantle the conveyor before normal working can be resumed.

The conveyor also serves as a guide or a track for the mining machine during its passage along the face and any misalignment of the conveyor is often reflected in the straightness of the mineral face itself. This becomes detrimental if the misalignment of the face makes it difficult to maintain a constant distance between the actual face, and the leading part of the roof engaging members of the roof support, thus allowing an unsupported area of roof to develop.

With a view to reducing this problem, it is known to fit one or more of the mine roof supports with a cord transducer which feeds out a length of cord behind the supports as they advance. The length of the cord which is fed out is measured and this information is fed into a computer, enabling the computer to calculate the distance travelled by the supports. This information can be used to control subsequent movement of the supports to ensure that any misalignment of the face is prevented or compensated for. If, for example, a cord transducer is provided on a mine roof support at each end of the face, steps can be taken to control the movement of the end supports so that they move by identical amounts, thus preventing the face from having a skew effect. In addition, further cord transducers can be used at other points in the face to help maintain face straightness and prevent or reduce any bowing effect.

The accuracy of a cord transducer is approximately 0.1 m. The cost of a cord transducer with associated cables is about #3460. A cord transducer is relatively unobtrusive, rugged, intrinsically safe electrically, which is very important in potentially explosive atmospheres, and consumes minimal power. However, the use of cord transducers enables measurement of face alignment only in the plane of face advance.

SUMMARY OF THE INVENTION

It is an object of the present invention to provide an improved mining apparatus and method that more accurately maintains straightness of a mineral face at less expense.

It is another object of the invention to provide an improved mining apparatus and method which collects and uses more information than is possible with a known cord transducer system to make alignment adjustments.

The invention provides mining apparatus comprising two rigid elongate members joined together in an articulated manner, and a signalling device arranged to provide information dependent upon the relationship of one of the members with respect to the other of the members.

The signalling device may be arranged to bridge the joint between the two members.

The members comprise components of a mine roof support, e.g. a canopy and rear shield, but in a preferred arrangement the members comprise adjacent pans of an articulated mine conveyor.

In the preferred mining apparatus, the signalling device assists in the measurement of the alignment of the conveyor, for example by producing a signal the magnitude of which varies with the angular displacement between the adjacent pans.

The signalling device comprises means to measure the angle between the adjacent pans.

The apparatus also comprises an elongate connection extending between the pans, angular displacement of the pans resulting in a measurable movement of the elongate member.

Movement may be measured using at least one strain gauge.

Alternatively, movement may be measured using a linear transducer and means to convert angular movement of the conveyor pans into linear movement.

The elongate connection may be arranged to slide axially with respect to one pan, a first linear transducer being mounted alongside the connection.

The apparatus may also have means to measure movement of the connection in the vertical direction, with respect to one of the members, thus making it possible to measure tilting of the conveyor pans with respect to one another in a vertical plane.

A second linear transducer may be positioned above or below the connection.

Means, e.g. a third linear transducer, may also be provided to measure movement of the connection in the direction of its longitudinal axis with respect to one of the members, thus making it possible to measure changes in the gap between adjacent conveyor pans.

Preferably, the linear transducers comprise rectilinear potentiometers.

The invention includes a method of measuring the alignment or misalignment of a mining conveyor, by monitoring the angular displacement between adjacent pans of the mining conveyor.

The method may also include the application of appropriate corrective action.

Other objects, features and advantages of the present invention will become apparent from the following detailed description of the best mode for carrying out the invention when taken in connection with the accompanying drawings.

BEST MODE FOR CARRYING OUT THE INVENTION

Figure 1:
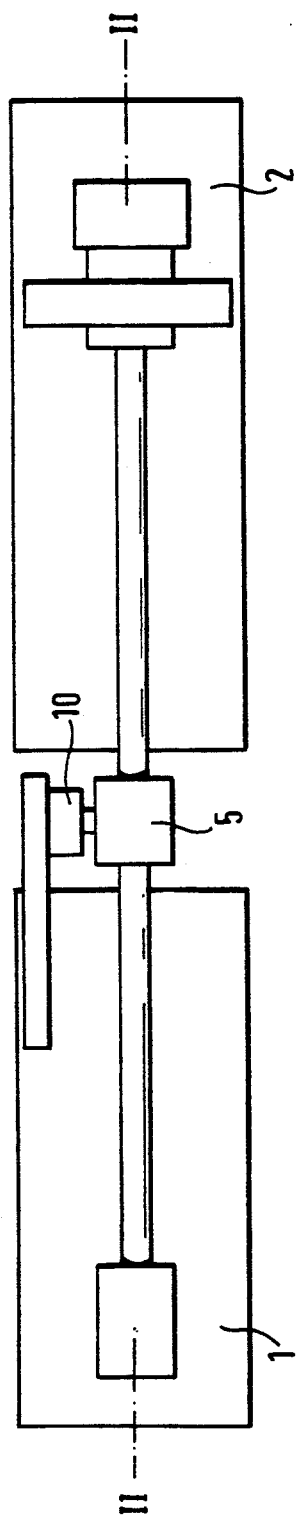
FIG. 1 is a plan view of part of an embodiment of mining apparatus according to the present invention.

With reference to FIG. 1, the apparatus comprises a pair of base members 1 and 2, which, in use, are respectively bolted to two adjacent pans of an articulated conveyor. The conveyor pans can pivot slightly out of alignment with one another to produce an angle therebetween.

Projecting upwardly from the base member 1 is a universal coupling 3. Pivotally connected to this universal coupling 3 is a connecting rod 4 which extends across the gap between the base members 1 and 2 to a second universal coupling 7 which permits longitudinal sliding movement of the connecting rod 4 through the coupling 7.

Figure 2:
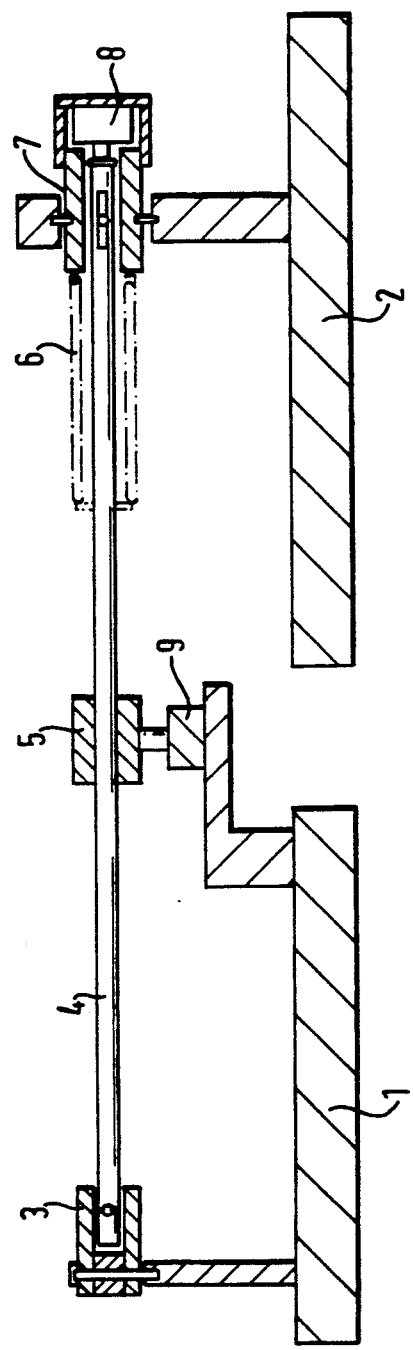
FIG. 2 is a cross-section along line 2—2 of FIG. 1 showing further parts of the apparatus.

If the conveyor gets out of alignment in the plane of face advance, then an angle will be created between the conveyor pans, and hence the bases 1 and 2, in the sense viewed in FIG. 1. A transducer in the form of a rectilinear potentiometer 10, illustrated in FIG. 2, is mounted on a bracket on the base member 1. It can be seen from an examination of FIG. 1 that if the base members 1 and 2 have an angular displacement between them, this will cause a corresponding movement of the rectilinear potentiometer which can be detected and measured.

Where conventional cord transducers are used, then for detailed control purposes, a transducer is mounted on every fourth support, in other words, at 6 meter intervals. The length of a conventional conveyor pan is 1.5 m and so there are four pan lengths over a 6 meter distance. Since the known cord transducers have accuracy of 0.1 m, this corresponds to a cumulative angular error over four pan lengths given by $O_E = \tan^{-1} 0.1/6$ i.e. $O_E = 0.95°$ For the cumulative error over four pan lengths to be less than 0.95°, the error in angular measurement between any two pans must be less than 0.95°/4, i.e. 0.23°. The use of the rectilinear potentiometer arrangement shown in FIG. 1 does in fact make it possible to provide an angular accuracy of 0.1°, thus introducing a significant safety factor when compared with the known cord transducer system.

Furthermore, the rectilinear potentiometer system can be manufactured to a price of #865, which is comparable with the #3460 cost of a cord transducer, bearing in mind that four conveyor pan transducers will be required for each six meter length of the mine face.

The rectilinear potentiometer system also fills the requirements of being unobtrusive, rugged, intrinsically safe, and consuming minimal power.

The arrangement shown in FIG. 1 gives added versatility, since it is also possible to measure face alignment in the plane of the face itself. Considering now FIG. 2, it is possible to detect angular displacement between the bases 1 and 2 in the sense shown in FIG. 2, by utilizing a further rectilinear potentiometer 9, which is coupled to the same bearing block 5 on the connecting rod 4, as is the rectilinear potentiometer 10. For the sake of clarity in FIGS. 1 and 2, transducer 10 has been omitted from FIG. 2, and transducer 9 has been omitted from FIG. 2.

Since the connecting rod 4 can slide in the universal coupling 7, it is also possible to obtain information about horizontal control and pan wear, since a change in the gap between pans can be measured by means of yet another rectilinear potentiometer 8.

With further reference to FIG. 1, reference numeral 6 indicates a tension spring to take up any slack in the universal couplings 3 and 7, although the spring means may not be required in all circumstances.

The arrangement shown in FIGS. 1 and 2 is designed to tuck into the space which exists at the bottom of existing conveyor trim, thus eliminating any errors resulting from trim twist.

Figure 3:
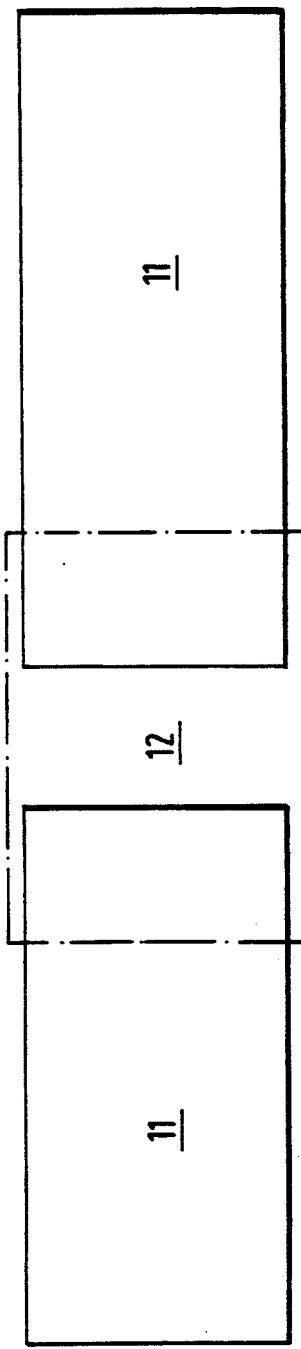
FIG. 3 is a plan view showing various covers of the apparatus.

As shown in FIG. 3, each of the base members 1 and 2 is covered by a rigid cover 11, and there is a flexible cover 12 which spans the gap between the rigid covers.

Since the position of each pan is given in terms of its angular relationship to the adjacent pan, rather than in absolute terms, sophisticated computer techniques may be required to calculate the position of any given pan relative to a datum line, and the use of at least some cord transducers may still be necessary or desirable, for example at each end of the face.

Instead of using sliding connections and linear transducers, alternative arrangement may use bending connections and strain gauges.

The embodiment enables conveyor misalignment to be measured, and face conveyor profiles, e.g. in both horizontal and vertical planes, may be stored in a face end computer. Corrective action can then be taken, for example by selective control of the subsequent movement of mine roof supports, and appropriate guidance of the mineral cutting machine, ensuring that the misalignment of the conveyor remains within acceptable limits. This has a number of benefits, such as reducing conveyor areas, and reducing misalignment of the mineral bearing face. A straight face promotes regular caving of the roof strata and hence good roof conditions. A gentle change in gradient along the face also minimizes computer wear.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. Mining apparatus having two rigid elongate members and a joint joining the members together in an articulated manner, said members comprising adjacent pans of an articulated mine conveyor, and a signalling device for assisting in the measurement of the alignment of the conveyor, the signalling device producing a signal the magnitude of which varies with the angular displacement between the adjacent pans.

2. Mining apparatus as claimed in claim 1, in which the signalling device comprises means to measure the angle between the adjacent pans.

3. Mining apparatus as claimed in claim 2, comprising an elongate connection extending between the pans, angular displacement of the pans resulting in a measurable movement of the elongate connection.

4. Mining apparatus as claimed in claim 3, in which movement is measured using at least one strain gauge.

5. Mining apparatus as claimed in claim 3, in which movement is measured using a linear transducer and means to convert angular movement of the conveyor pans into linear movement.

6. Mining apparatus as claimed in claim 3, in which the elongate connection is arranged to slide axially with respect to one pan, a first linear transducer being mounted alongside the connection.

7. Mining apparatus as claimed in claim 6, in which the linear transducer comprises a rectilinear potentiometer.

8. Mining apparatus as claimed in claim 3, also having means to measure movement of the connection in the vertical direction, with respect to one of the members, thus making it possible to measure tilting of the conveyor pans with respect to one another in a vertical plane.

9. Mining apparatus as claimed in claim 8, in which a second linear transducer positioned above or below the connection.

10. Mining apparatus as claimed in claim 9, in which means are also provided to measure movement of the connection in the direction of its longitudinal axis with respect to one of the members.

11. Mining apparatus as claimed in claim 10, in which the means to measure movement of the connection in the direction of its longitudinal axis comprise a third linear transducer.

12. Mining apparatus as claimed in claim 1, in which the signalling device is arranged to bridge the joint between the two members.

* * * * *